(12) United States Patent
Khadilkar et al.

(10) Patent No.: US 12,393,195 B2
(45) Date of Patent: Aug. 19, 2025

(54) METHOD AND SYSTEM FOR REINFORCEMENT LEARNING AND DUAL CHANNEL ACTION EMBEDDING BASED ROBOTIC NAVIGATION

(71) Applicant: Tata Consultancy Services Limited, Mumbai (IN)

(72) Inventors: Harshad Khadilkar, Thane West (IN); Hardik Bharat Meisheri, Thane West (IN); Omkar Dilip Shelke, Thane West (IN); Durgesh Kalwar, Thane West (IN); Pranavi Pathakota, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 208 days.

(21) Appl. No.: 18/355,099

(22) Filed: Jul. 19, 2023

(65) Prior Publication Data
US 2024/0028039 A1    Jan. 25, 2024

(30) Foreign Application Priority Data
Jul. 20, 2022   (IN) .............................. 202221041617

(51) Int. Cl.
G05D 1/02 (2020.01)
G05D 1/00 (2006.01)

(52) U.S. Cl.
CPC .................................. G05D 1/0221 (2013.01)

(58) Field of Classification Search
CPC .. G05D 1/0221; G05D 1/644; G05D 2101/15; G05D 2105/87; G05D 2109/10; G06N 3/0455; G06N 3/092
See application file for complete search history.

(56) References Cited

U.S. PATENT DOCUMENTS

2023/0196059 A1 * 6/2023 Laszlo ................. G06N 3/0455
706/15
2023/0406360 A1 * 12/2023 Al-Rfou ................. B60W 40/04

FOREIGN PATENT DOCUMENTS

DE     102020200165 A1 *  7/2021 .............. B25J 13/00
EP        3748455 A1 * 12/2020 ........... G05B 13/027
WO    WO2021050488 A1     3/2021

OTHER PUBLICATIONS

Benetis et al., "Nearest Neighbor and Reverse Nearest Neighbor Queries for Moving Objects", Jul. 19, 2002, Aalborg University, pp. 1-18 (Year: 2002).*

(Continued)

*Primary Examiner* — Erin M Piateski
*Assistant Examiner* — Ashley Tiffany Schoech
(74) *Attorney, Agent, or Firm* — Finnegan, Henderson, Farabow, Garrett & Dunner, LLP

(57) ABSTRACT

The present disclosure provides a Reinforcement Learning (RL) based architecture to efficiently learn action embeddings in low dimensional space. In conventional methods, the embeddings are learnt with the sole objective of improving policy learning, and there are no specific requirements on the quality of the embeddings. Initially, the system receives a goal to be reached by a mobile robot and a current location of the mobile robot is obtained. Simultaneously current transition dynamics associated with the plurality of directional actuators are obtained using a Reinforcement Learning (RL) technique. Further, a plurality of embeddings is computed based on the current location of the mobile robot and the current transition dynamics using a trained Dual Channel Training (DCT) based autoencoder decoder model. Finally, a displacement vector for current navigation of the mobile robot is computed based on the computed plurality of embeddings using the RL technique.

6 Claims, 10 Drawing Sheets

(56) References Cited

OTHER PUBLICATIONS

Qian et al., "A Novel Indoor Localization Method Based on Image Retrieval and Dead Reckoning", May 29, 2020, Shanghai Jiao Tong University, No. 10-3803, pp. 1-20 (Year: 2020).*
Schlegel et al., "General Value Function Networks", Jan. 2021, Journal of Artificial Intelligence Research, No. 70, pp. 497-543, (Year: 2021).*
Tanaka et al., "TRANS-AM", Jun. 4, 2021, IEEE International Conference on Robotics and Automation, pp. 4627-4633 (Year: 2021).*
Trabucco et al., "AnyMorph" Jun. 28, 2022, International Conference on Machine Learning, pp. 1-15 (Year: 2022).*
Amiranashvili, Artemij et al., "Pre-training of Deep RL Agents for Improved Learning under Domain Randomization", Date: Apr. 21, Publisher: Arxiv, Link: https://arxiv.org/pdf/2104.14386.pdf.
Piergiovanni, AJ et al., "Learning Real-World Robot Policies by Dreaming", Title of the item: 2019, IEEE/RSJ International Conference on Intelligent Robots and Systems (IROS), Date: Mar. 2008, Nov. 2019, Publisher: IEEE, Link: https://arxiv.org/pdf/1805.07813.pdf.
Rothfuss, Jonas et al., "Deep Episodic Memory: Encoding, Recalling, and Predicting Episodic Experiences for Robot Action Execution", Title of the item: IEEE Robotics and Automation Letters, Date: Jan. 2018, Publisher: IEEE, Link: https://h2t.anthropomatik.kit.edu/pdf/RothfussFerreira2018.pdf.

* cited by examiner

METHOD AND SYSTEM FOR REINFORCEMENT LEARNING AND DUAL CHANNEL ACTION EMBEDDING BASED ROBOTIC NAVIGATION

PRIORITY CLAIM

This U.S. patent application claims priority under 35 U.S.C. § 119 to: India Application No. 202221041617, filed on Jul. 20, 2022. The entire contents of the aforementioned application are incorporated herein by reference.

TECHNICAL FIELD

The disclosure herein generally relates to the field of robotics and automation and, more particularly, to a method and system for Reinforcement Learning (RL) and Dual Channel (DC) action embedding based robotic navigation.

BACKGROUND

Reinforcement learning (RL) is being widely used in applications such as games and robotics. However, real-world problems that involve many discrete action choices are still very challenging for traditional RL based algorithms. For example, in applications such as recommendation systems, supply chains, complex high fidelity games, resource management at scale in data centers, investment management, large action spaces are handled indirectly using pre- or post-processing heuristics. The key challenge is with exploring large action spaces sufficiently well to arrive at optimal policies. Furthermore, hand-crafted heuristics for mapping RL outputs to actions become intractable as the number of actions increases. For example, considering the dynamic systems like robotic navigation, exploration of action spaces is needed due to the presence of multiple actuators, wherein the number of unique combinations of actions grows exponentially with the number of actuators.

Conventional methods are generally based on latent representations of actions to solve reinforcement learning (RL) problems. One conventional approach assumes that action representations are already known, while the RL policy outputs a 'proto-action' in embedding space and uses k-nearest-neighbor search to decode the action representation to actual action. Another conventional approach assumes prior embedding knowledge, followed by policy training using expert demonstrations. Some other conventional approaches focused on the use of action embeddings for task transfer and later for generalizing to unseen actions. In the above cases, the primary objective was to learn embeddings that are well suited to generalize on a distribution of related tasks. They also depended on knowledge of a hierarchical structure in the action space. An alternative perspective is to handle environments where certain actions are redundant, i.e., have identical effects on the environment. In each of these studies, the embeddings are learnt with the sole objective of improving policy learning, and there are no specific requirements on the quality of the embeddings.

SUMMARY

Embodiments of the present disclosure present technological improvements as solutions to one or more of the above-mentioned technical problems recognized by the inventors in conventional systems. For example, in one embodiment, a method for Reinforcement Learning (RL) and Dual Channel (DC) action embedding based robotic navigation is provided. The method includes receiving by one or more hardware processors, a goal to be reached by a mobile robot and a data pertaining to an unknown action space associated with the goal, wherein the mobile robot is associated with a plurality of sensors and a plurality of directional actuators. Further, the method includes obtaining, by the one or more hardware processors, a current location of the mobile robot in the unknown action space using a trained real time query based General Value Function Network (GVFN), wherein the real time query based GVFN is trained for directed exploration using pre-learned general characteristics of a plurality of known action spaces. Furthermore, the method includes simultaneously obtaining, by the one or more hardware processors, current transition dynamics associated with the plurality of directional actuators in the unknown action space using a Reinforcement Learning (RL) technique. Furthermore, the method includes computing, by the one or more hardware processors, a plurality of embeddings based on the current location of the mobile robot and the current transition dynamics using a trained Dual Channel Training (DCT) based autoencoder decoder model, wherein each of the plurality of embeddings comprises information to predict a future state and reconstruct a previous action, wherein a decoder associated with the autoencoder decoder model comprises two channels corresponding to an action reconstruction and a future state prediction. Finally, the method includes computing, by the one or more hardware processors, a displacement vector for current navigation of the mobile robot based on the computed plurality of embeddings using the RL technique, wherein the displacement vector is a sum of displacement vectors corresponding to each of the plurality of directional actuators.

In another aspect, a system for Reinforcement Learning (RL) and Dual Channel (DC) action embedding based robotic navigation is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a goal to be reached by a mobile robot and a data pertaining to an unknown action space associated with the goal, wherein the mobile robot is associated with a plurality of sensors and a plurality of directional actuators. Further, the one or more hardware processors are configured by the programmed instructions to obtain a current location of the mobile robot in the unknown action space using a trained real time query based General Value Function Network (GVFN), wherein the real time query based GVFN is trained for directed exploration using pre-learned general characteristics of a plurality of known action spaces. Furthermore, the one or more hardware processors are configured by the programmed instructions to simultaneously obtain current transition dynamics associated with the plurality of directional actuators in the unknown action space using a Reinforcement Learning (RL) technique. Furthermore, the one or more hardware processors are configured by the programmed instructions to compute a plurality of embeddings based on the current location of the mobile robot and the current transition dynamics using a trained Dual Channel Training (DCT) based autoencoder decoder model, wherein each of the plurality of embeddings comprises information to predict a future state and reconstruct a previous action, wherein a decoder associated with the autoencoder decoder model comprises two channels corresponding to an action reconstruction and a future state prediction. Finally, the one or more hardware processors are configured by the programmed instructions to compute a displacement vector for current navigation of the mobile robot based on the computed plurality of embeddings using the RL technique, wherein the displacement vector is a sum of displacement vectors corresponding to each of the plurality of directional actuators.

In yet another aspect, a computer program product including a non-transitory computer-readable medium having embodied therein a computer program for Reinforcement Learning (RL) and Dual Channel (DC) action embedding based robotic navigation is provided. The computer readable program, when executed on a computing device, causes the computing device to receive a goal to be reached by a mobile robot and a data pertaining to an unknown action space associated with the goal, wherein the mobile robot is associated with a plurality of sensors and a plurality of directional actuators. Further, the computer readable program, when executed on a computing device, causes the computing device to obtain a current location of the mobile robot in the unknown action space using a trained real time query based General Value Function Network (GVFN), wherein the real time query based GVFN is trained for directed exploration using pre-learned general characteristics of a plurality of known action spaces. Furthermore, the computer readable program, when executed on a computing device, causes the computing device to simultaneously obtain current transition dynamics associated with the plurality of directional actuators in the unknown action space using a Reinforcement Learning (RL) technique. Furthermore, computer readable program, when executed on a computing device, causes the computing device to compute a plurality of embeddings based on the current location of the mobile robot and the current transition dynamics using a trained Dual Channel Training (DCT) based autoencoder decoder model, wherein each of the plurality of embeddings comprises information to predict a future state and reconstruct a previous action, wherein a decoder associated with the autoencoder decoder model comprises two channels corresponding to an action reconstruction and a future state prediction. Finally, the computer readable program, when executed on a computing device, causes the computing device to compute a displacement vector for current navigation of the mobile robot based on the computed plurality of embeddings using the RL technique, wherein the displacement vector is a sum of displacement vectors corresponding to each of the plurality of directional actuators.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
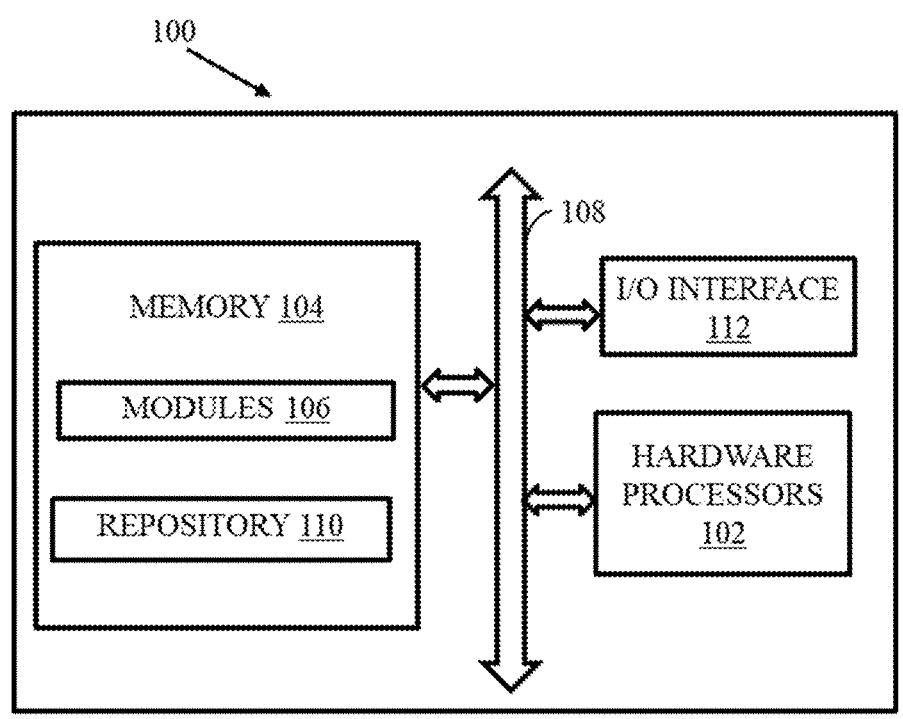
FIG. 1 is a functional block diagram of a system for Reinforcement Learning (RL) and Dual Channel (DC) action embedding based robotic navigation, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Conventional methods are generally based on raw action inputs to solve Reinforcement Learning (RL) problems. One of the conventional approaches assumes that action representations are known in the form of prior embedding knowledge, followed by policy training using expert demonstrations. Another conventional approach is focused on the use of action embeddings for task transfer and later for generalizing to unseen actions. In each of these studies, the embeddings are learnt with the sole objective of improving policy learning, and there are no specific requirements on the quality of the embeddings.

Embodiments herein provide a method and system for RL and DC action embedding based robotic navigation. The present disclosure provides an RL based architecture to efficiently learn action embeddings in low dimensional action space. The embeddings are computed in such a way that the embeddings can learn the effect of actions and to predict future states. Initially, the system receives a goal to be reached by a mobile robot and a data pertaining to an unknown action space associated with the goal. The mobile robot is associated with a plurality of sensors and a plurality of directional actuators. Further, a current location of the mobile robot in the unknown action space is obtained using a trained real time query based General Value Function Network (GVFN). Simultaneously current transition dynamics, associated with the plurality of directional actuators in the unknown action space are obtained using a RL technique. Further, a plurality of embeddings is computed based on the current location of the mobile robot and the current transition dynamics using a trained Dual Channel Training (DCT) based autoencoder decoder model. Finally, a displacement vector for current navigation of the mobile robot is computed based on the computed plurality of embeddings using the RL technique, wherein the displacement vector is a sum of displacement vectors corresponding to each of the plurality of directional actuators. The present disclosure generates a low dimensional action space by using the real time query based GVFN and the DCT based autoencoder decoder model which makes the system more efficient than the conventional approaches.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 is a functional block diagram of a RL and DC action embedding based robotic navigation, in accordance with some embodiments of the present disclosure. The system 100 includes or is otherwise in communication with hardware processors 102, at least one memory such as a memory 104, and I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases. For example, other devices comprise a plurality of sensors and a plurality of actuators associated with the mobile robot. The "mobile robot" is alternatively represented as agent throughout the document.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 5:
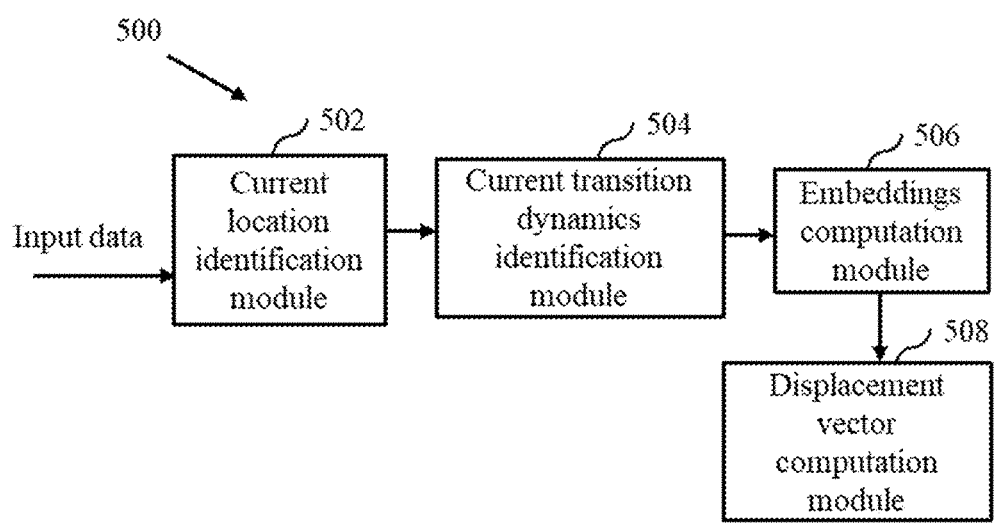
FIG. 5 illustrates a functional architecture of the system of FIG. 1, for RL and DC action embedding based robotic navigation, in accordance with some embodiments of the present disclosure.

The plurality of modules 106 include programs or coded instructions that supplement applications or functions performed by the system 100 for RL and DC action embedding based robotic navigation. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the semantic navigation using spatial graph and trajectory history. In an embodiment, the modules 106 includes a current location identification module (shown in FIG. 5), current transition dynamics identification module (shown in FIG. 5), an embeddings computation module (shown in FIG. 5) and a displacement vector computation module (shown in FIG. 5). In an embodiment, FIG. 5 illustrates a functional architecture of the system of FIG. 1, for RL and DC action embedding based robotic navigation, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIGS. 2A and 2B and the components depicted in FIG. 3.

Figure 2:
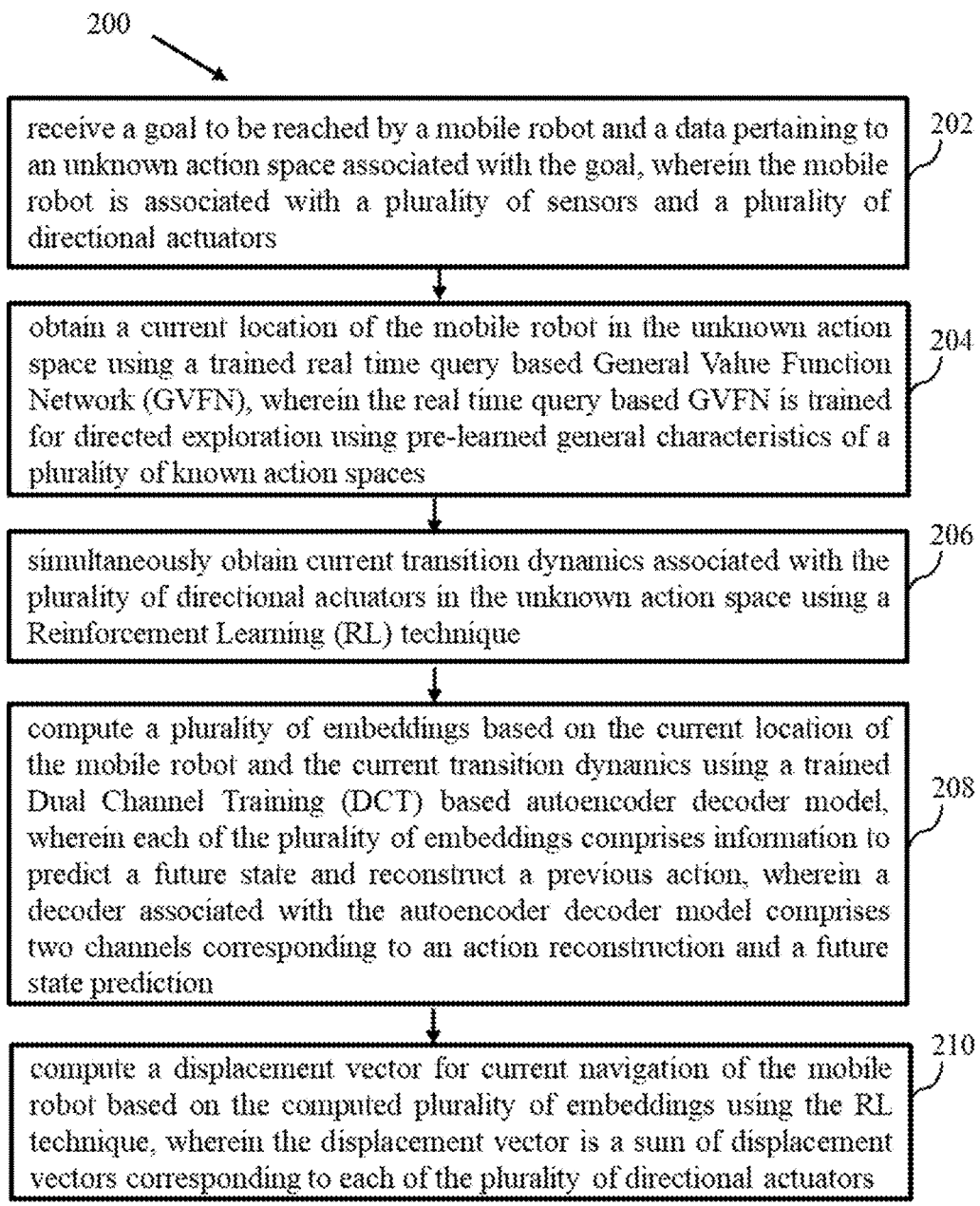
FIG. 2 is an exemplary flow diagram illustrating a processor implemented method for RL and DC action embedding based robotic navigation, implemented by the system of FIG. 1, in accordance with some embodiments of the present disclosure.
Figure 3A:
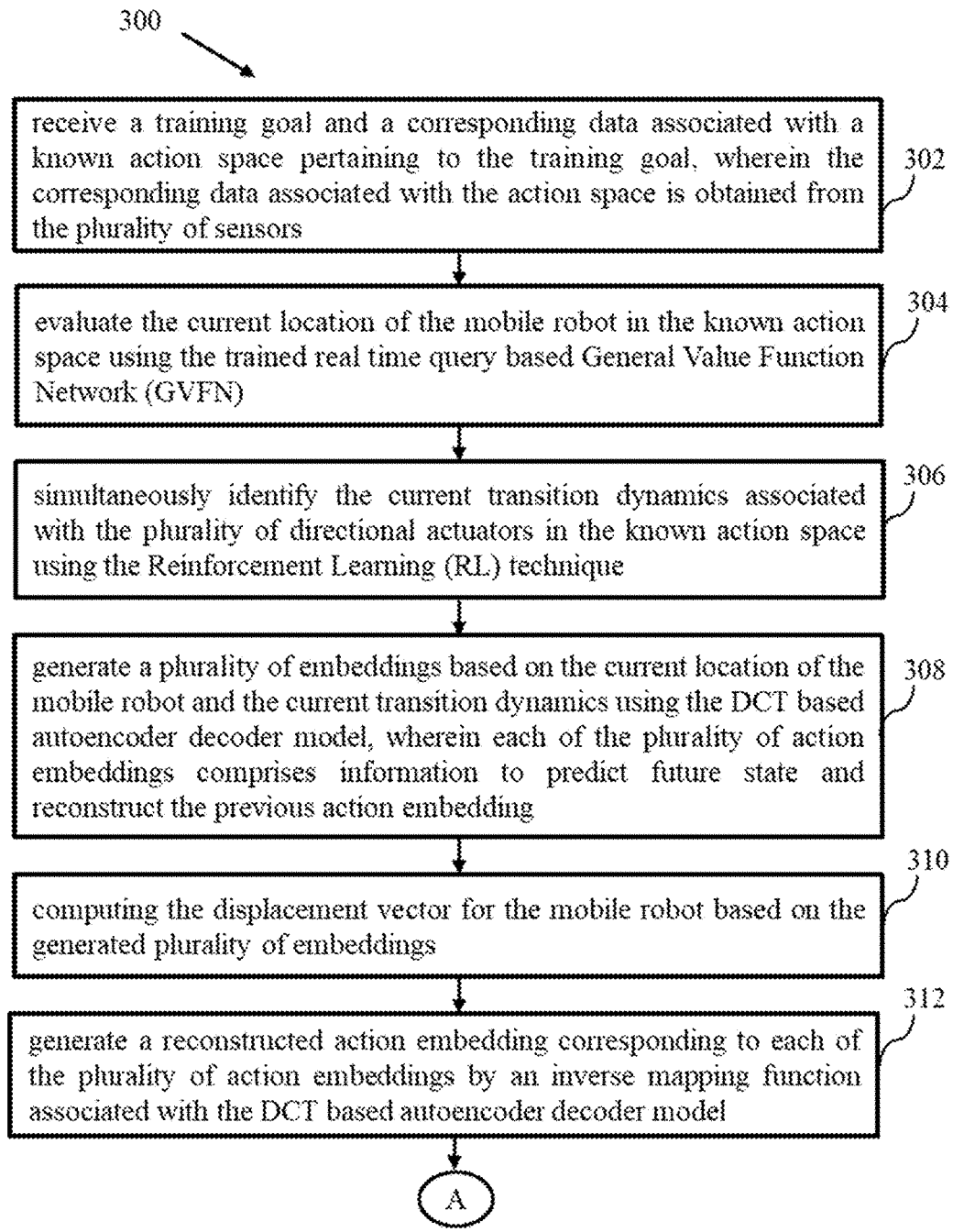
FIGS. 3A and 3B are exemplary flow diagrams illustrating a method for training RL and DC architecture for robotic navigation implemented by the system of FIG. 1 according to some embodiments of the present disclosure.
Figure 3B:
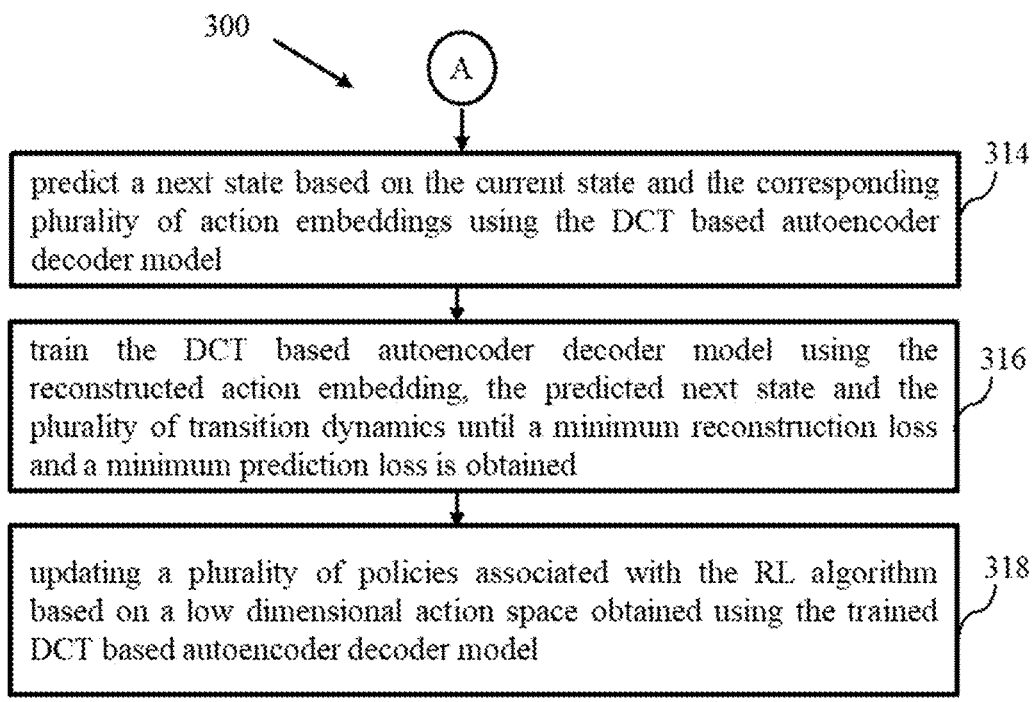

FIG. 2 is an exemplary flow diagram illustrating a method 200 for RL and DC action embedding based robotic navigation implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1, the steps of flow diagram as depicted in FIG. 2, FIG. 3A, FIG. 3B and the modules depicted in FIG. 5. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

In an embodiment, the RL problem of the present disclosure is modelled as a Markov Decision Problem (MDP). An MDP is defined as a tuple (S, A, T, R, γ, $ρ_0$), wherein S is the state, A is the action, T is the transition function, R is the reward at time t∈$Z^+$ are denoted by random variables $s_t$∈S, $a_t$∈A, $r_t$∈R. T is the transition function from one state to another and parameterized by the action, defined by T:S× A→S. The transition function can be deterministic or stochastic. The discount factor γ∈[0.1] applies to future rewards and $ρ_0$ represents the distribution on initial states. The goal of the agent is to find an optimal policy that maximizes the expected future return $E[\Sigma_{t=0}^{\infty} \gamma^t r_t]$.

At step 202 of the method 200, the one or more hardware processors 102 are configured by the programmed instructions to receive the goal to be reached by the mobile robot and the data pertaining to the unknown action space associated with the goal. The mobile robot is associated with the plurality of sensors and the plurality of directional actuators. The plurality of sensors includes a plurality of vision sensors, a plurality of localization sensors and a plurality of depth sensors.

At step 204 of the method 200, the current location identification module 502 executed by one or more hardware processors 102 is configured by the programmed instructions to obtain the current location of the mobile robot in the unknown action space using the trained real time query based GVFN. The real time query based GVFN is trained for directed exploration using pre-learned general characteristics of a plurality of known action spaces.

In an embodiment, the GVFN includes a plurality of General Value Functions (GVF) and each of the plurality of GVFs are trained using a corresponding query from a plurality of queries associated with the known action space. Further, a first short action sequence is selected from a plurality of action sequences encoded by each of the plurality of trained GVFs. Further, the GVFN is trained to further exploring a set of action sequences based on the first short action sequence using epsilon greedy approach.

For example, the mobile robot or the agent is trained to observe general characteristics of the known environment in addition to its primary task of reaching the goal. The general characteristics of the known environment are learnt by the mobile robot by identifying "sub-goals" such as the presence of doors in a corridor, or walls in a room by simply memorising the sequence of actions. The auxiliary characteristics of the environment are represented in the robot's memory by a set of "general value functions". The robot is able to answer queries such as "how many steps do I need to reach door A?" using these learnt functions. Using this additional information, the robot learns its navigation tasks much more effectively, and can adapt to new goals much more quickly as well (for example, moving the goal state or requiring standing on a specific tile in order to open a door).

At step 206 of the method 200, the current transition dynamics identification module 504 executed by the one or more hardware processors 102 is configured by the programmed instructions to simultaneously obtain the current transition dynamics associated with the plurality of directional actuators in the unknown action space using the RL technique.

For example, considering the mobile robot with two actuators (motors), each with the option of being on or off (binary), the number of possible actions at any time is four: on-on, on-off, off-on, and off-off respectively for the two motors. As the number of actuators increases, the number of unique actions increases at the rate of $2^n$. This is without even going into the possibility of having finer settings than on/off for each actuator, and possibility of observing different behaviour in different contexts (on flat surfaces, on sloping surfaces, with and without wind). Exploring all possible actions in all possible states in such scenarios is challenging and verging on impossible. However, using RL agent, the robotic system performs a small number of "experiments" to understand how different actuators interact to produce motion. It then learns to group similar action sets, greatly reducing the number of unique combinations.

At step 208 of the method 200, the embeddings computation module 506 executed by the one or more hardware processors 102 is configured by the programmed instructions to compute the plurality of embeddings based on the current location of the mobile robot and the current transition dynamics using the trained Dual Channel Training (DCT) based autoencoder decoder model. Each of the plurality of embeddings includes information to predict future state and reconstruct the previous action. The decoder associated with the autoencoder decoder model includes two channels corresponding to an action reconstruction and a future state prediction.

FIGS. 3A and 3B are exemplary flow diagrams illustrating the method 300 for training RL and DC architecture for robotic navigation implemented by the system of FIG. 1 according to some embodiments of the present disclosure.

In an embodiment, the method for training the DCT based autoencoder decoder model is explained in conjunction with FIGS. 3A and 3B. Now referring to FIGS. 3A and 3B, at step 302 of method 300, a training goal to be reached by the mobile robot and the corresponding data associated with a known action space pertaining to the training goal is received. The corresponding data associated with the action space is obtained from the plurality of sensors. At step 304 of the method 300, the current location of the mobile robot in the known action space is obtained using the trained real time query based GVFN. At step 306 of the method 300, the current transition dynamics associated with the plurality of directional actuators in the known action space is simultaneously identified using the RL technique.

At step 308 of the method 300, the plurality of embeddings is computed based on the current location of the mobile robot and the current transition dynamics using the DCT based autoencoder decoder model. Each of the plurality of action embeddings includes information to predict future state and reconstruct the previous action embedding. For example, given state $s_t$; and action $a_t$, the encoder portion gives embeddings $X_t$ and $E_t$ respectively.

Figure 4A:
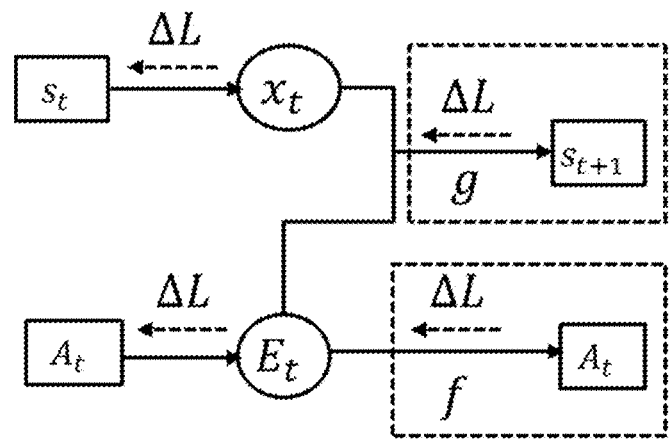
FIGS. 4A and 4B are example functional architectures for DC training based autoencoder decoder implemented by the system of FIG. 1, in accordance with some embodiments of the present disclosure.

In an embodiment, the functional architecture for the DCT based autoencoder-decoder model which can be trained simultaneously for dual tasks (both the computation of embeddings to low-dimensional space and the recovery of actions in the original space) is shown in FIG. 4A. Now referring to FIG. 4A, $s_t$ is the current state, $s_{t+1}$ is the future state or next state, $A_t$ is the action, $X_t$, $E_t$ are embeddings. The DCT loss (ΔL) ensures that the action embeddings $E_t$ encode information sufficient for both action reconstruction as well as next state prediction. The action reconstruction is performed by the decoder $f$ of the architecture shown in FIG. 4A and the next state prediction is performed by the function $g$ of the architecture shown in FIG. 4A. This ensures that the environment dynamics as well as the distinct action embeddings are on track.

In an embodiment, the DCT based autoencoder decoder includes 4 layers for generating $E_t$. For action space of size $2n$ there is a fully connected architecture with layers of size $[2^n/2, 2^n/4, 2^n/8, 2]$ neurons, with last layer denoting the use of a 2-D embedding space ε. The decoder function $f$ has an exactly inverse architecture for recovering the original action. Adam optimizer is used for training with batch size of 128. For training internal policy Tri, Deep Deterministic Policy Gradient (DDPG) is utilized. The actor and critic of the RL model utilizes a 4 layer network with [30, 20, 10] neurons up to the penultimate layer, followed by output layer of 1 neuron for the critic and 2 neurons for the actor. Here, tanh activation has been utilized throughout all the networks which helps in restricting the values of $E_t$ in addition to having good gradient properties.

Now, referring back to FIG. 3A, at step 310 of method 300, the displacement vector for the mobile robot is computed based on the generated plurality of embeddings. For example, consider the case of a mobile robot with 4 actuators for four directions (front, back, left, right). A step towards the right followed by one step forward will result in the same displacement as a step forward followed by one towards the right. In such instances, the embeddings for these actions should be similar. The specific vectors generated depend on the training and represent any set of values in n-dimensional space. The same concept is applied in much higher dimensions.

At step 312 of method 300, a reconstructed action embedding corresponding to each of the plurality of action embeddings are generated by an inverse mapping function $f$ associated with the DCT based autoencoder decoder model. In an embodiment, the decoder of the DCT based autoencoder decoder model includes two channels, parameterized by functions g and $f$ as shown in FIG. 4A. Inverse mapping function $f$ maps the dense representation $E_t$ to recover the actual action $a_t$.

At step 314 of method 300, a next state is predicted based on the current state and the corresponding plurality of action embeddings using the DCT based autoencoder decoder model.

For example, the transition model g predicts $s_{t+1}$ given the state and action embeddings. Note that $f$ depends only on $E_t$ as input while g takes into account both $X_t$ and $E_t$ to reconstruct the next state. It is worth noting that if the states are linear they can be reconstructed back to its original space ($X_t$ is the identity mapping). If the states are complex (such as images), then reconstruction can be done in embedding or latent space. The encoder-decoder model is jointly trained using DCT, with loss gradients flowing through both $f$ and g. The generic loss function is given by equation (1). Now referring to equation (1), $L_1(g(X_t,E_t),s_{t+1}$ is the prediction loss and $$\frac{1}{N} * \log P(a_t \mid f, E_t)$$

is the reconstruction loss.

$$L = L_1(g(X_t, E_t), s_{t+1} - \eta * \frac{1}{N} * \log P(a_t \mid f, E_t) \quad (1)$$

where $L_1$ is a metric to measure the state prediction loss, N is the number of actions, and $P(a_t|f,E_t)$ is the softmax probability of decoding the embedding $E_t$ to the correct action at, as parameterized by $f$. As mentioned earlier, the prediction loss can be defined directly over the state $s_{t+1}$ (through KL divergence or mean squared error) if the state space is linear, or the embedding $X_{t+1}$ can be used if the state space is complex.

At step 316 of method 300, the DCT based autoencoder decoder model is trained using the reconstructed action embedding, the predicted next state and the plurality of transition dynamics until a minimum reconstruction loss and a minimum prediction loss is obtained.

In an embodiment, the action reconstruction loss is a simple cross-entropy term where the truth vector is one-hot encoded for the input action $a_t$, and the output probability distribution is the softmax distribution produced by the trained decoder $f$. The multiplier η is a hyperparameter (entropy coefficient) used for trading off the importance between the two loss terms. In an embodiment, the entropy coefficient η, controls the spread and defines the width of separation between the actions in the embedding space ε.

At step 318 of method 300, a plurality of policies associated with the RL algorithm are updated based on a low dimensional action space obtained using the trained DCT based autoencoder decoder model.

Figure 4B:
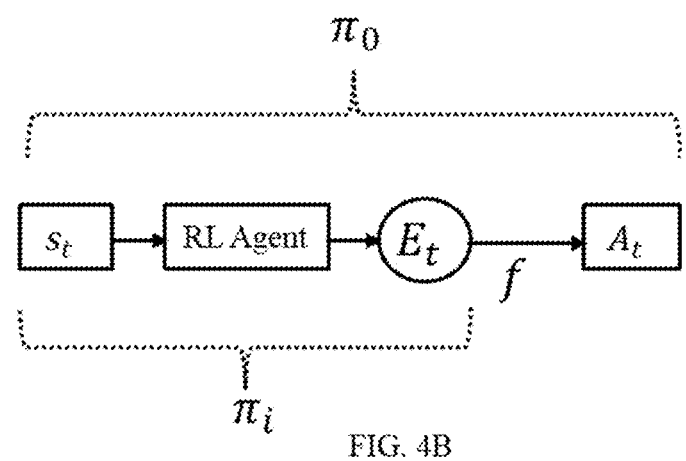

In an embodiment, after training the encoder-decoder model, the internal policy $π_j$ is learnt over the low dimensional action embedding space ε using any standard model-free RL algorithm. Encoder function is no longer used, while the decoder $f$ is used to map the output action representations from $π_j$ to the original action space as shown in FIG. 4B. In an embodiment, the RL technique associated with the present disclosure learns a composite outer policy Ito in two phases as illustrated in FIG. 4B. In the first phase, a parameterized embedding-to-action mapping function $f:ε→A$ is learnt via the encoder-decoder training illustrated in FIG. 4A. In the second phase, the internal policy $π_j:S→ε$ is learnt such that the distribution of $A_t$ is characterized by the following equations (2), (3) and (4).

$$E_t ≈ π_i(·|S_t) \quad (2)$$

$$A_t = f(E_t) \quad (3)$$

$$A_t ≈ π_0(·|S_t) = f(π_i(·|S_t)) \quad (4)$$

Now referring back to FIG. 2, at step 210 of the method 200, the displacement vector computation module 508 executed by the one or more hardware processors 102 is configured by the programmed instructions to compute the displacement vector for current navigation of the mobile robot based on the computed plurality of embeddings using the RL technique. The displacement vector is a sum of displacement vectors corresponding to each of the plurality of directional actuators.

Figure 6:
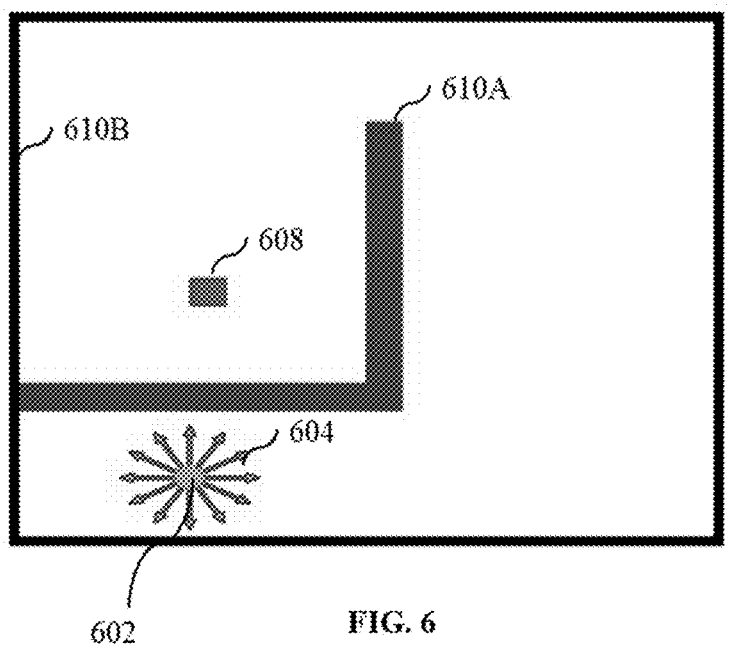
FIGS. 6 through 8 illustrates experimental details of the system of FIG. 1, for RL and DC action embedding based robotic navigation, in accordance with some embodiments of the present disclosure.
Figure 7A:
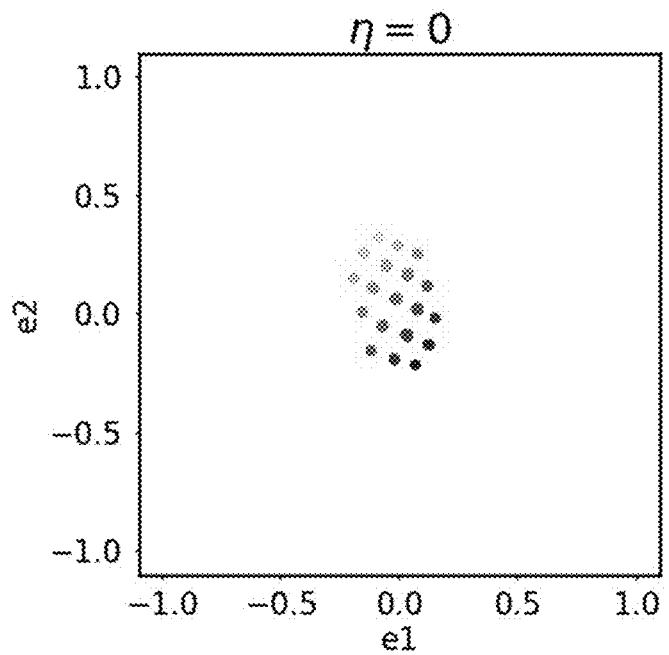
Figure 7B:
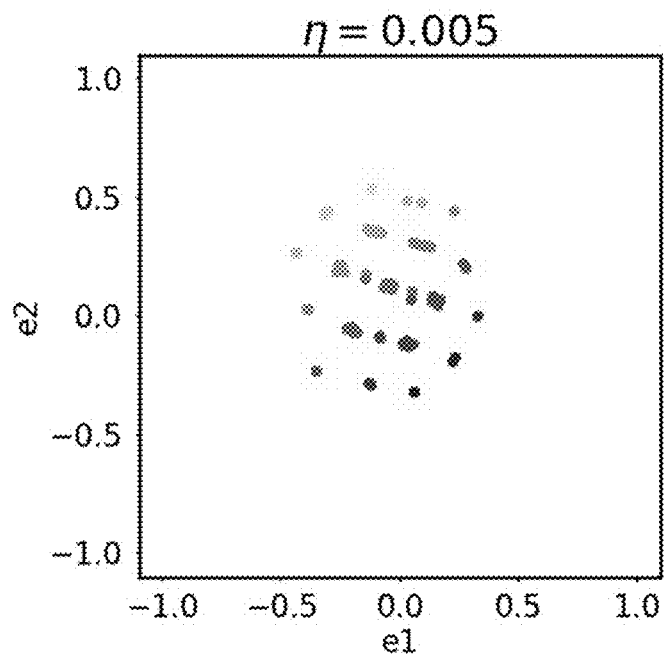
Figure 7C:
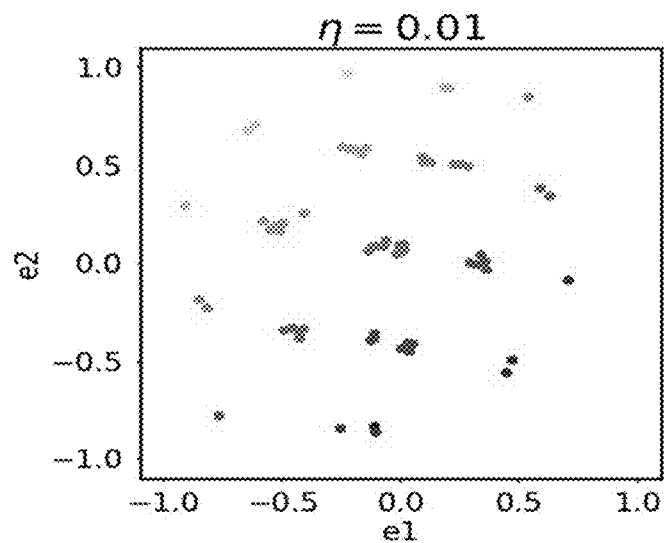
Figure 7D:
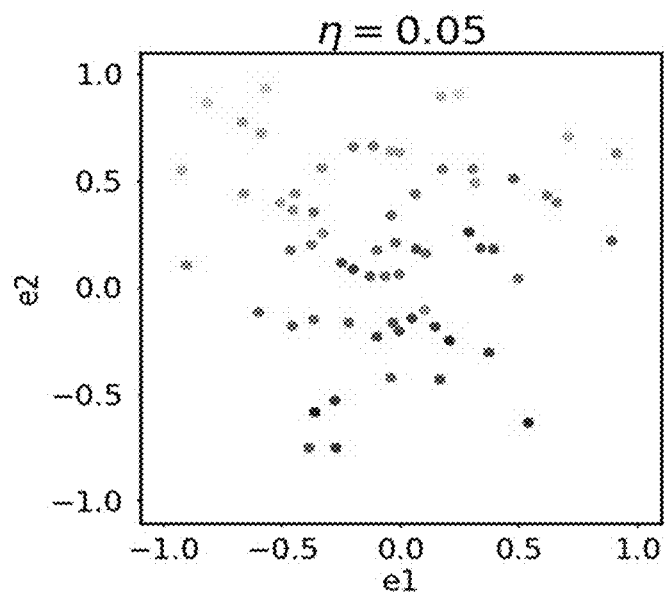

The present disclosure is experimented in a 2-D Maze environment. The environment incorporates an agent which has 'n' number of actuators with equal angular spacing around it. FIG. 6 provides an illustration of the training and testing 2D Maze environment. Now referring to FIG. 6, 602 is the agent or mobile robot, 604 is the plurality of actuators and 608 is the goal or target. can either be turned on or off, and the action at is the binary string of n digits that describes the setting of each actuator. Clearly, the action space scales exponentially with the number of actuators, with $2^n$ unique actions for n actuators. When the actuator is turned on, it would cause the agent to move in the direction it is pointing towards in the 2D space. The final displacement of the agent would be the sum of displacement vectors of all the selected actuators.

In an embodiment, the state space includes Cartesian coordinates $(x_{a,t}, y_{a,t})$ of the agent and the coordinates $(x_g, y_g)$ of the goal. At each time step t, the agent selects the binary setting of each of the 'n' actuators. A small penalty of −0.05 is given for each intermediate step, and a terminal reward of +100 is provided for reaching the goal. In addition, penalty of −0.01 is given if agent collides with any obstacle. A timeout of 500 steps is applied in case the agent does not reach the goal. There are obstacles present in the environment (grey walls 610A and 610B of FIG. 6), which restrict the movement of the agent. This also provides exploration challenges as the agent has to travel around the walls to reach the goal. Additional noise is provided by ignoring the specified action with a probability of 0.1 and applying a uniform random action instead. The randomness during the course of learning and the exploring size of the action space makes the environment a highly complex stochastic problem. Also, as there are many combinations of selecting actuators that result in a similar final displacement vector output for the agent, this environment acts as a perfect simulator to leverage the structure present in the actions and represent them in a low dimensional space.

In an embodiment, during initial part of training, the embeddings are trained using the respective architectures, and then trained $\pi_j$ using DDPG. All the results presented here are averaged across 10 random seeds. Since for maze environment, state is denoted by Cartesian coordinates, mean squared loss L1 (given in equation (1)) is used.

Initially, the present disclosure has been trained with for $2^{10}$ and $2^{11}$ actions (10 and 11 actuators respectively). It is observed that the results of the present disclosure outperform the conventional methods, converging earlier and reaching a higher reward. In addition, it is worthwhile to note that the present disclosure has a significantly lower standard deviation across random seeds, especially in larger action spaces providing evidence of the robustness of embeddings. Further, experiments were conducted from $2^4$ to $2^{12}$ actions to analyze the consistency and trend for varying action space sizes. It is observed that, as the number of actions increase, the performance of the conventional approaches drastically decreases after 27 actions. However, the present disclosure outperforms the conventional methods even when the number of action increases.

Figure 8:
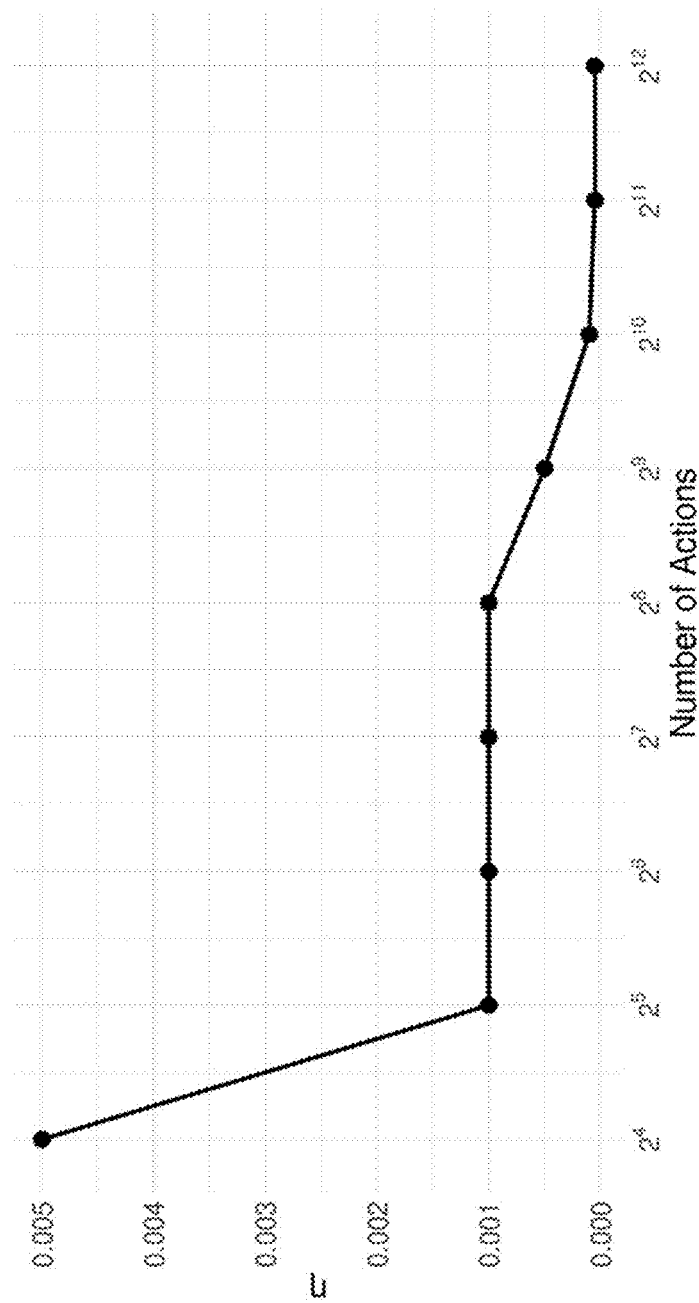

FIGS. 7A through 7D provides visualization of $2^6$ actions into 2D embedding space. It is observed that increasing the value of η up to a certain point (0.01), increases the separation between the points while retaining the structure of those embeddings. Beyond 0.01 although there is a higher degree of separation, the inherent structure and relations between different action points is lost. In addition, it is observed that as the number of actions increases the value of η for which the maximum separation exponentially decreases as can be seen in FIG. 8.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of learning robust policies while generalizing large action spaces in noisy environments. Further, the present disclosure provides a novel framework to efficiently learn action embeddings that simultaneously allow to reconstruct the original action as well as predict the expected future state. Further, the encoder-decoder architecture is implemented for action embeddings with a dual channel loss that balances between action reconstruction and state prediction accuracy. The trained decoder is used in conjunction with a standard RL algorithm that produces actions in the embedding space.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, for displacement vector computation in unknown action spaces, the method comprising:

receiving, by one or more hardware processors, a goal to be reached by a mobile robot and a data pertaining to an unknown action space associated with the goal, wherein the mobile robot is associated with a plurality of sensors and a plurality of directional actuators;

obtaining, by the one or more hardware processors, a current location of the mobile robot in the unknown action space using a trained real time query based General Value Function Network (GVFN), wherein the real time query based GVFN is trained for directed exploration using pre-learned general characteristics of a plurality of known action spaces and wherein the method of training the GVFN for directed exploration using epsilon greedy approach comprises:

training each of a plurality of General Value Functions (GVF) associated with the GVFN using a corresponding query from a plurality of queries associated with the action space;

selecting a first short action sequence from a plurality of action sequences encoded by each of the plurality of trained GVFs; and training the GVFN by further exploring a plurality of action sequences based on the first short action sequence using epsilon greedy approach;

simultaneously obtaining, by the one or more hardware processors, current transition dynamics associated with the plurality of directional actuators in the unknown action space using a Reinforcement Learning (RL) technique;

computing, by the one or more hardware processors, a plurality of embeddings based on the current location of the mobile robot and the current transition dynamics using a trained Dual Channel Training (DCT) based autoencoder decoder model, wherein each of the plurality of embeddings comprises information to predict a future state and reconstruct a previous action, wherein a decoder associated with the autoencoder decoder model comprises two channels corresponding to an action reconstruction and a future state prediction; and computing, by the one or more hardware processors, a displacement vector for current navigation of the mobile robot based on the computed plurality of embeddings using the RL technique, wherein the displacement vector is a sum of displacement vectors corresponding to each of the plurality of directional actuators.

2. The processor implemented method of claim 1, wherein the method for training the DCT based autoencoder decoder model comprises:

receiving a training goal and a corresponding data associated with a known action space pertaining to the training goal, wherein the corresponding data associated with the action space is obtained from the plurality of sensors;

evaluating the current location of the mobile robot in the known action space using the trained real time query based General Value Function Network (GVFN);

simultaneously identifying the current transition dynamics associated with the plurality of directional actuators in the known action space using the Reinforcement Learning (RL) technique;

generating a plurality of embeddings based on the current location of the mobile robot and the current transition dynamics using the DCT based autoencoder decoder model, wherein each of the plurality of action embeddings comprises information to predict future state and reconstruct the previous action embedding;

computing the displacement vector for the mobile robot based on the generated plurality of embeddings;

generating a reconstructed action embedding corresponding to each of the plurality of action embeddings by an inverse mapping function associated with the DCT based autoencoder decoder model;

predicting a next state based on the current state and the corresponding plurality of action embeddings using the DCT based autoencoder decoder model;

training the DCT based autoencoder decoder model using the reconstructed action embedding, the predicted next state and the plurality of transition dynamics until a minimum reconstruction loss and a minimum prediction loss is obtained; and updating a plurality of policies associated with the RL algorithm based on a low dimensional action space obtained using the trained DCT based autoencoder decoder model.

3. A system comprising:

at least one memory storing programmed instructions; one or more Input/Output (I/O) interfaces; and one or more hardware processors operatively coupled to the at least one memory, wherein the one or more hardware processors are configured by the programmed instructions to:

receive a goal to be reached by a mobile robot and a data pertaining to an unknown action space associated with the goal, wherein the mobile robot is associated with a plurality of sensors and a plurality of directional actuators;

obtain a current location of the mobile robot in the unknown action space using a trained real time query based General Value Function Network (GVFN), wherein the real time query based GVFN is trained for directed exploration using pre-learned general characteristics of a plurality of known action spaces and wherein the method of training the GVFN for directed exploration using epsilon greedy approach comprises:

training each of a plurality of General Value Functions (GVF) associated with the GVFN using a corresponding query from a plurality of queries associated with the action space;

selecting a first short action sequence from a plurality of action sequences encoded by each of the plurality of trained GVFs; and training the GVFN by further exploring a plurality of action sequences based on the first short action sequence using epsilon greedy approach;

simultaneously obtain current transition dynamics associated with the plurality of directional actuators in the unknown action space using a Reinforcement Learning (RL) technique;
compute a plurality of embeddings based on the current location of the mobile robot and the current transition dynamics using a trained Dual Channel Training (DCT) based autoencoder decoder model, wherein each of the plurality of embeddings comprises information to predict a future state and reconstruct a previous action, wherein a decoder associated with the autoencoder decoder model comprises two channels corresponding to an action reconstruction and a future state prediction; and
compute a displacement vector for current navigation of the mobile robot based on the computed plurality of embeddings using the RL technique, wherein the displacement vector is a sum of displacement vectors corresponding to each of the plurality of directional actuators.

4. The system of claim 3, wherein the method for training the DCT based autoencoder decoder model comprises:
receiving a training goal and a corresponding data associated with a known action space pertaining to the training goal, wherein the corresponding data associated with the action space is obtained from the plurality of sensors;
evaluating the current location of the mobile robot in the known action space using the trained real time query based General Value Function Network (GVFN);
simultaneously identifying the current transition dynamics associated with the plurality of directional actuators in the known action space using the Reinforcement Learning (RL) technique;
generating a plurality of embeddings based on the current location of the mobile robot and the current transition dynamics using the DCT based autoencoder decoder model, wherein each of the plurality of action embeddings comprises information to predict future state and reconstruct the previous action embedding;
computing the displacement vector for the mobile robot based on the generated plurality of embeddings;
generating a reconstructed action embedding corresponding to each of the plurality of action embeddings by an inverse mapping function associated with the DCT based autoencoder decoder model;
predicting a next state based on the current state and the corresponding plurality of action embeddings using the DCT based autoencoder decoder model;
training the DCT based autoencoder decoder model using the reconstructed action embedding, the predicted next state and the plurality of transition dynamics until a minimum reconstruction loss and a minimum prediction loss is obtained; and
updating a plurality of policies associated with the RL algorithm based on a low dimensional action space obtained using the trained DCT based autoencoder decoder model.

5. One or more non-transitory machine readable information storage mediums comprising one or more instructions which when executed by one or more hardware processors causes:
receiving a goal to be reached by a mobile robot and a data pertaining to an unknown action space associated with the goal, wherein the mobile robot is associated with a plurality of sensors and a plurality of directional actuators;
obtaining a current location of the mobile robot in the unknown action space using a trained real time query based General Value Function Network (GVFN), wherein the real time query based GVFN is trained for directed exploration using pre-learned general characteristics of a plurality of known action spaces and wherein the method of training the GVFN for directed exploration using epsilon greedy approach comprises:
training each of a plurality of General Value Functions (GVF) associated with the GVFN using a corresponding query from a plurality of queries associated with the action space;
selecting a first short action sequence from a plurality of action sequences encoded by each of the plurality of trained GVFs; and
training the GVFN by further exploring a plurality of action sequences based on the first short action sequence using epsilon greedy approach;
simultaneously obtaining current transition dynamics associated with the plurality of directional actuators in the unknown action space using a Reinforcement Learning (RL) technique;
computing a plurality of embeddings based on the current location of the mobile robot and the current transition dynamics using a trained Dual Channel Training (DCT) based autoencoder decoder model, wherein each of the plurality of embeddings comprises information to predict a future state and reconstruct a previous action, wherein a decoder associated with the autoencoder decoder model comprises two channels corresponding to an action reconstruction and a future state prediction; and
computing a displacement vector for current navigation of the mobile robot based on the computed plurality of embeddings using the RL technique, wherein the displacement vector is a sum of displacement vectors corresponding to each of the plurality of directional actuators.

6. The one or more non-transitory machine readable information storage mediums of claim 5, wherein the method for training the DCT based autoencoder decoder model comprises:
receiving a training goal and a corresponding data associated with a known action space pertaining to the training goal, wherein the corresponding data associated with the action space is obtained from the plurality of sensors;
evaluating the current location of the mobile robot in the known action space using the trained real time query based General Value Function Network (GVFN);
simultaneously identifying the current transition dynamics associated with the plurality of directional actuators in the known action space using the Reinforcement Learning (RL) technique;
generating a plurality of embeddings based on the current location of the mobile robot and the current transition dynamics using the DCT based autoencoder decoder model, wherein each of the plurality of action embeddings comprises information to predict future state and reconstruct the previous action embedding;
computing the displacement vector for the mobile robot based on the generated plurality of embeddings;
generating a reconstructed action embedding corresponding to each of the plurality of action embeddings by an inverse mapping function associated with the DCT based autoencoder decoder model;

predicting a next state based on the current state and the corresponding plurality of action embeddings using the DCT based autoencoder decoder model;

training the DCT based autoencoder decoder model using the reconstructed action embedding, the predicted next state and the plurality of transition dynamics until a minimum reconstruction loss and a minimum prediction loss is obtained; and updating a plurality of policies associated with the RL algorithm based on a low dimensional action space obtained using the trained DCT based autoencoder decoder model.

* * * * *